(12) United States Patent
Davies et al.

(10) Patent No.: US 7,197,277 B2
(45) Date of Patent: Mar. 27, 2007

(54) LOCALISED AUDIO DATA DELIVERY

(75) Inventors: Robert J. Davies, Horley (GB); Paul J. Rankin, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1023 days.

(21) Appl. No.: 09/876,442

(22) Filed: Jun. 7, 2001

(65) Prior Publication Data

US 2002/0016165 A1 Feb. 7, 2002

(30) Foreign Application Priority Data

Jun. 26, 2000 (GB) .................................. 0015453.4

(51) Int. Cl.
*H04B 5/00* (2006.01)
*H04B 7/00* (2006.01)
*H04B 7/185* (2006.01)
*H04M 1/64* (2006.01)

(52) U.S. Cl. ..................... 455/41; 455/13.3; 379/67.1

(58) Field of Classification Search ................. 455/41, 455/412.1, 13.3; 375/133, 322; 379/67.1; 709/219
See application file for complete search history.

(56) References Cited

U.S. PATENT DOCUMENTS

| | | | |
|---|---|---|---|
| 5,539,921 A * | 7/1996 | Tayloe | 455/13.3 |
| 5,835,861 A | 11/1998 | Whiteside | 455/466 |
| 6,085,235 A * | 7/2000 | Clarke, Jr. et al. | 709/219 |
| 6,366,622 B1 * | 4/2002 | Brown et al. | 375/322 |
| 6,480,713 B2 * | 11/2002 | Jenkins | 455/412.1 |
| 6,529,584 B1 * | 3/2003 | Ravago et al. | 379/67.1 |
| 6,574,266 B1 * | 6/2003 | Haartsen | 375/133 |
| 6,681,107 B2 * | 1/2004 | Jenkins et al. | 455/412.1 |

OTHER PUBLICATIONS

Publication entitled "People, Places, Things: Web Presence for the Real World"; www.cooltown.hp.com/papers/webpres/WebPresence; Hewlett-Packard Laboratories; pp. 1-20.

* cited by examiner

*Primary Examiner*—Wing Chan
*Assistant Examiner*—Thjuan P. Knowlin
(74) *Attorney, Agent, or Firm*—Paul Im

(57) ABSTRACT

A communications system comprises at least one beacon device capable of wireless message transmission and at least one portable device capable of receiving such a message transmission. The beacon is arranged to broadcast a series of inquiry messages each in the form of a plurality of predetermined data fields (INQ) arranged according to a first communications protocol, such as Bluetooth. For the delivery of additional data via broadcast, the beacon adds to each inquiry message prior to transmission an additional data field (BCD) carrying audio data, with the portable device receiving the transmitted inquiry messages, reading the audio data from the additional data field, and reproducing the audio to a user.

10 Claims, 2 Drawing Sheets

LOCALISED AUDIO DATA DELIVERY

Figure 1:
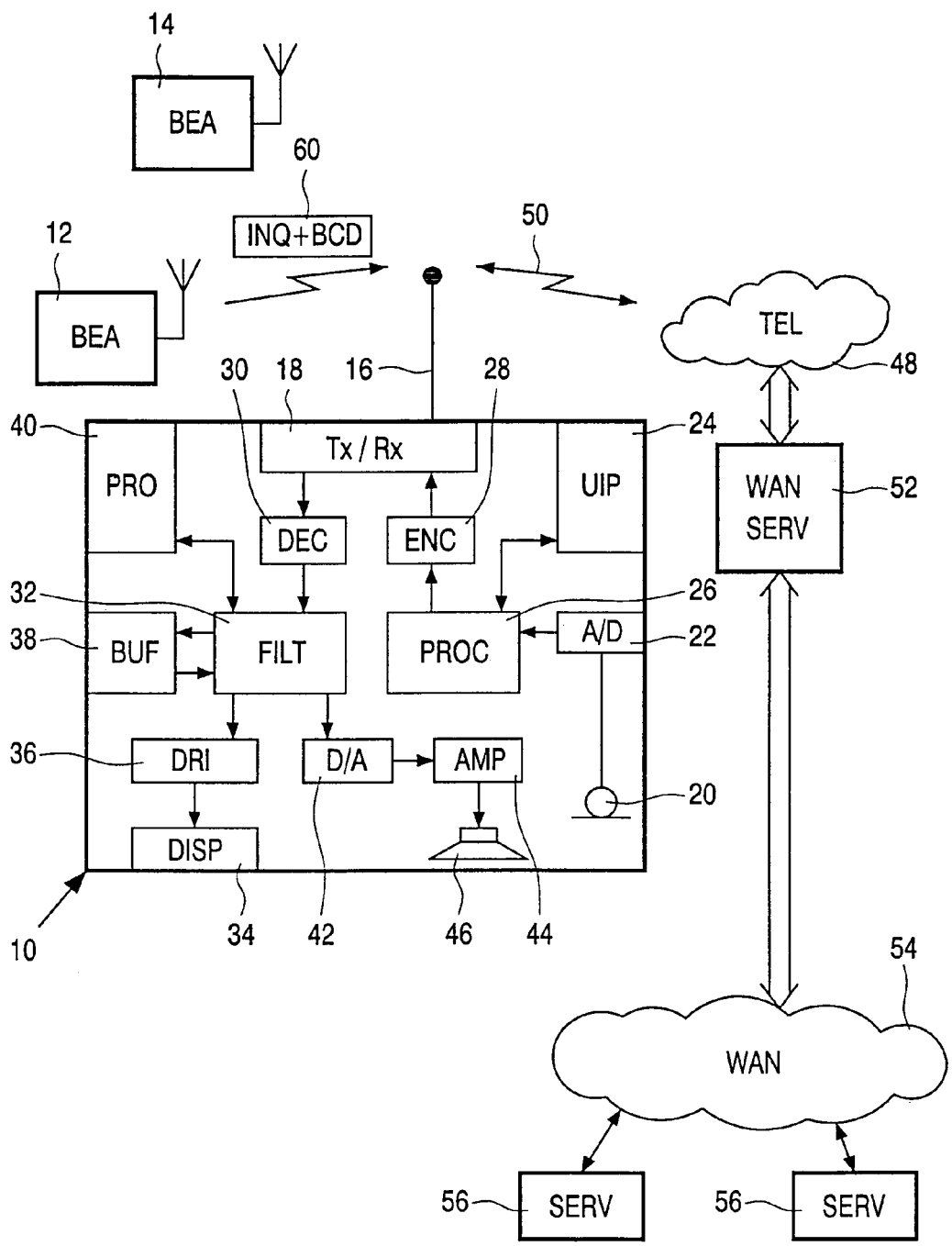

The present invention relates to services offered to users of electronic equipment and methods for implementing the same, especially but not exclusively the invention relates to the delivery of audio data to users of mobile communications devices such as portable telephones and suitably equipped PDA's (personal digital assistants).

Recent years have seen a great increase in subscribers world-wide to mobile telephone networks and, through advances in technology and the addition of functionalities, cellular telephones have become personal, trusted devices. A result of this is that a mobile information society is developing, with personalised and localised services becoming increasingly more important. Such "Context-Aware" (CA) mobile telephones are used with low power, short range base stations in places like shopping malls to provide location-specific information. This information might include local maps, information on nearby shops and restaurants and so on. The user's CA terminal may be equipped to filter the information received according to pre-stored user preferences and the user is only alerted if an item of data of particular interest has been received.

In an example of a CA terminal, Hewlett-Packard has posted a publication on the Web at:

<http://www.cooltown.hp.com/papers/webpres/WebPresence.htm> about their "Cooltown" project. The convergence of Web technology, wireless networks and portable client devices provides design opportunities for computer/communications systems. In the Cooltown project, systems that are location-aware can be created using URL's for addressing, physical URL's for delivery via beacons and sensing of URL's for discovery, and localised web servers for directories. The systems are ubiquitous to support nomadic users. On top of this infrastructure the Internet connectivity can be leveraged to support communications services. Web presence bridges the World Wide Web and the physical world inhabited by the users, providing a model for supporting nomadic users without a central control point.

The Cooltown Museum and Bookstore offers visitors a Web-enhanced experience. As visitors tour the museum, their portable digital assistant (PDA) can receive Web URLs from wireless "beacons". These beacons are small infrared transceivers located close to pictures or sculptures; the URLs link into a Web of information about the items. Using the PDA's Web browser, visitors can read or hear about the artist or the work and about related art works in the museum. The URLs can also be stored as bookmarks for further study or they can be used to select reproductions of the artwork from the museum's online store.

In connection with the delivery of audio data, there are many examples of one-way speech services in everyday use: apart from broadcast television and radio services, there are dial-up information services such as the speaking clock and recorded weather forecasts, as well as public address systems and display commentary systems used in a number of museums and art galleries. Each of these has different characteristics, but all are essentially unidirectional non-interactive services.

Communications protocols such as the Bluetooth standards could be used to provide access to such audio-based services in conventional fashion, by allowing portable terminals to join a piconet and request a point-to-point link over which the required audio stream may be sent. As will be recognised, however, a broadcast mechanism has a number of advantages for both terminal and base station or beacon. Firstly, through not requiring the portable device to transmit (to join the piconet), battery power for the portable device is conserved. Secondly, the broadcasting beacon can reach many portable devices simultaneously, which may be of particular importance in crowded environments. In terms of security considerations for the user, through not being required to transmit, the portable device is not required to divulge its identity. Lastly, routing broadcast data through a single broadcast channel, rather than selectively over several point-to-point links, is easier to implement.

It is therefore an object of the invention to provide a system for the delivery of audio data having the above advantages.

In accordance with a first aspect of the present invention there is provided a method for enabling the user of a portable communications device to receive broadcast audio messages wherein at least one beacon device broadcasts a series of messages each in the form of a plurality of predetermined data fields arranged according to a first communications protocol, wherein the beacon adds to each such message prior to transmission an additional data field carrying broadcast audio message data, and wherein the portable device receives the transmitted messages, extracts the audio broadcast data from said additional data field, and reproduces the audio to the user. By adding the audio data as packets attached to a broadcast message, the handset or terminal is not required to broadcast in order to obtain the audio data.

Preferably, although not essentially, the first communications protocol comprises Bluetooth messaging and the broadcast series of messages are inquiry messages for the establishment of two-way communications.

Also in accordance with the present invention there is provided an audio data communications system comprising at least one beacon device capable of wireless message transmission and at least one portable device capable of receiving such a message transmission, wherein the beacon is arranged to broadcast a series of messages each in the form of a plurality of predetermined data fields arranged according to a first communications protocol, wherein the beacon is further arranged to add to each such message prior to transmission an additional data field carrying audio data, and wherein the at least one portable device is arranged to receive the transmitted messages, read the audio data from said additional data field and reproduce the same for the user.

Suitably, the beacon may be arranged to include an indication in one of said predetermined data fields, said indication denoting the presence of audio data in said additional data field. As before, the first communications protocol may comprise Bluetooth messaging.

Still further in accordance with the present invention there is provided a mobile communication device for use in the above-recited system, the device comprising a receiver capable of receiving a short-range wireless message including a plurality of data fields according to said first communications protocol, means for determining when said additional data field has been added to said plurality of data fields, means for reading audio data from such an additional data field, and reproduction means for presenting the same to a user.

A method and suitable infrastructure for downloading the audio data, in additional packets added to contact-establishing inquiry messages in Bluetooth and similar protocols, is given in the co-pending and commonly assigned UK patent application no. 0020099.8 entitled "Data Delivery Through Beacons".

Figure 2:
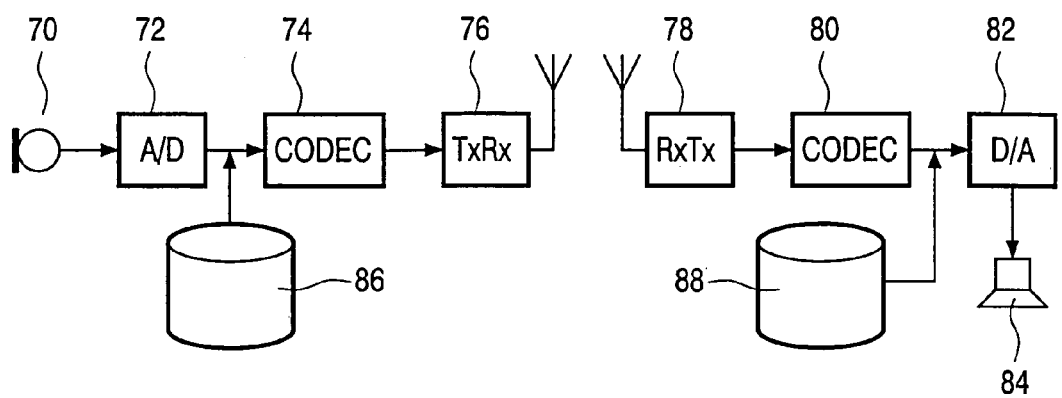
Figure 3:
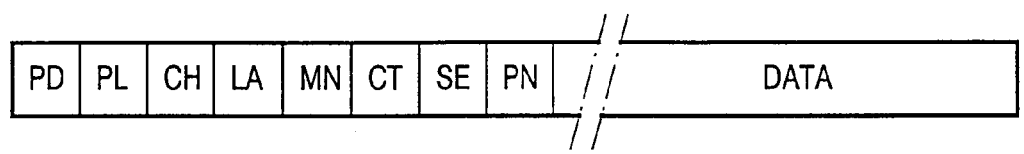

Preferred embodiments of the invention will now be described, by way of example only, and with reference to the accompanying drawings, in which:

FIG. 1 is a block schematic diagram of a beacon and portable device embodying the invention;

FIG. 2 schematically represents data flow through the components of beacon and portable device; and FIG. 3 represents a sample configuration of broadcast audio packet.

In the following description we consider particularly a CA application which utilises Bluetooth protocols for communication of audio messages from beacon to portable device (whether telephone, MP3 player or other). As will be recognised, the general invention concept of including an audio broadcast channel as part of a message delivery procedure is not restricted to Bluetooth devices and inquiry procedures, and is applicable to other communications arrangements, in particular frequency hopping systems.

The following CA application based on Bluetooth protocols and suitable to host the present audio delivery process is described in greater detail in the above-referenced commonly-assigned application entitled "Data Delivery Through Beacons", the disclosure of which is incorporated herein by reference. A summary of that disclosure follows for the purposes of illustration.

FIG. 1 is a block schematic diagram of a CA mobile telephone 10 in use with one or more low power, short range base stations or beacons 12, 14. Such an arrangement may be used in places like shopping malls to provide location-specific information such as audio advertisement messages from nearby shops and restaurants, community information and so on, with the beacon downloading the audio data piggy-backed on information keys to a mobile device. An information key is a small data object that provides a reference to a source of full information, and it is in the form of a number of predetermined fields, one of which will contain a short piece of descriptive text presented to a user. Another field will be a pointer or address of some form, for example a URL or telephone number. Other supplementary fields may control how the data is presented to a user and how the address may be exploited. The beacon will generally broadcast cyclically a number of these keys, each typically relating to a different service.

The user's CA terminal 10 comprises an aerial 16 coupled with transceiver stage 18 for the reception and transmission of messages. Outgoing messages result from user input to the telephone, either audio input via microphone 20 and A/D converter 22 or other data input via the keypad or other input means 24. These inputs are processed to message data format by signal and data processing stage 26 and converted to transmission format by encoder 28 before being supplied to the transceiver stage 18.

Messages received via the aerial 16 and transceiver 18 are passed via a decoding stage 30 to a filtering and signal processing stage 32. If the data carried by the message is for presentation on a display screen 34 of the telephone, the data will be passed to a display driver 36, optionally after buffering 38, with the driver formatting the display image. Where the message is carrying audio data from one or other of the beacons 12, 14, the telephone has the ability to filter the information received according to pre-stored 40 user preferences and the user is only alerted (i.e. the information will only be replayed or retained in buffer 38 for later presentation) if comparison of stored preference data and subject matter indicators in the message indicate that an item of data of particular interest has been received.

For both piggy-backed and conventional audio messages, the audio data is output by the filter and processing stage 32, via D/A converter 42 and amplifier 44 to an earphone or speaker 46. Receipt of such messages from the telephone network 48 is indicated by arrow 50: the telephone network 48 also provides the link from the telephone 10 to a wide-area network (WAN) server 52 and, via the WAN 54 (which may be the internet), to one or more remote service providers 56 providing a source of data for the telephone 10.

Communication between the CA terminal (telephone 10) and the CA base station (beacon 12) takes two forms: 'push' and 'pull'. In 'push' mode, information is broadcast by the beacons 12, 14, to all portable terminals 10 in the form of short 'keys' indicated at 60. The keys will take various forms according to the application but will generally include a concise description of the information being sent and a pointer to fuller information, e.g. a URL identifying one of the service providers 56.

Keys are received by the terminal 10 'unconsciously', that is, without direct intervention by the user, and automatically filtered according to the user's pre-set preferences. Some will be discarded, some kept for further study, others might cause the user to be alerted immediately. Sometimes the user will wish to obtain more information than is contained in the keys. Here, 'pull' mode allows a user to set up a connection with a server 56 (which need not necessarily be specially configured for CA use) and actively request information to pull down into the terminal 10. This mode is therefore typically interactive.

As indicated, a strong candidate technology for the wireless link necessary for at least the 'push' mode of the above-described CA system is Bluetooth, on the grounds that it is expected to become a component part of a large number of mobile telephones 10. In analysing the Bluetooth protocol for CA audio broadcast or 'push' mode utilisation, a problem may be seen. In the ideal case, the terminal 10 will detect fixed beacons 12, 14 and extract basic information from them without the terminal 10 needing to transmit at all. However, this type of broadcast operation is not supported by the current Bluetooth specification, due to the frequency hopping nature of Bluetooth beacon systems which means that, in order for broadcast messages (or, indeed, any messages) to be received by a passing terminal, the terminal has to be synchronised to the beacon in both time and frequency.

The Bluetooth inquiry procedure has been proposed specifically to solve the problem of bringing together broadcast stations (beacons) and portable devices (slaves): the applicants have described in their above-referenced co-pending case how it is possible to piggy-back a broadcast channel on the inquiry messages issued by the master. Only CA terminals need read the broadcast channel messages and only CA base stations or beacons send them. In consequence, at the air interface, the mechanism is entirely compatible with conventional (non-CA) Bluetooth systems. In this scenario, a gross transmission rate for broadcast on the inquiry messaging of around 64 kB per cycle is provided: if the beacon performs the inquiry cycle continuously—that is to say it only broadcasts and never establishes a piconet, then we have a gross bit rate of 50 kB/s.

Current codecs provide for acceptable speech quality at rates down to 8 kB/s and even lower. Consequently, four or five continuous parallel speech broadcast services may be run in this bandwidth. Alternatively, the compressive power of wide-band audio codecs such as MPEG II layer 3 (MPG3), RealNetworks RealSystem G2 and Microsoft MS Audio may be used to send broadcast stereo FM-quality audio. Further possibilities, including continuous streaming of audio are available if the information key format is used but with the information field replaced by audio speech or music data and the header used by the portable device filter mechanism to discriminate between interesting and irrelevant keys. Whilst some form of header will be required for differentiation between parallel streams, it should still be possible to multiplex several discontinuous audio services in the broadcast bandwidth. Such services may include short audio announcements or audio updates ("sound-bites") in the manner of automated SMS (short message service) or paging information services.

As for the embodiment of FIG. 1, a typical embodiment comprises a Bluetooth-equipped GSM, UMTS or other cellular telephone; this has advantage in that suitable audio codecs for voice are already available, although it will be recognised that there are of course other platforms. Aside from audio-equipped PDA's and laptop personal computers, further audio devices may be made Bluetooth compatible and further configured to embody the present invention. Such devices may include personal radios, tape and/or disc players, MP3 storage and replay devices, wireless headphones, and so forth. For these devices, the Bluetooth capability allows audio to be sent (in real or non-real time) via a point-to-point wireless link to another similarly equipped device or audio data store or server, for example. The ability to receive broadcast audio data piggy-backed on Bluetooth or similar significantly extends the utility of the personal audio equipment.

FIG. 2 schematically represents in simplified form the data flow for a system supporting the invention. In the configuration shown, speech data from a microphone 70 is converted into digital samples by A/D converter 72 before the digital stream is passed to codec 74. The low rate stream from codec 74 is passed to Bluetooth base station 76 from whence it is broadcast in the manner described in the co-pending application and elaborated below. The transmitted data is received by Bluetooth receiver 78, passed through a codec 80 and D/A converter 82 before the recovered audio is output via loudspeaker 84. As shown at 86 and 88, data stores may be added for the local storage of messages in plain or coded form. There are many possible variations on this scheme, including the use of preset messages, messages synthesised from sampled words or allophones and speech synthesis. The skilled reader will be aware of further variations.

At the base station or beacon, the speech data is packetised before being sent over the air: as described in the co-pending application, up to 64 kB of user information may be conveyed in the broadcast field in an inquiry field lasting 10.24 seconds. A broadcast audio packet suitably comprises a number of fields, as shown in FIG. 3, of which the following is a non-exhaustive list:

Header:

| | |
|---|---|
| PD | Packet protocol discriminator (set for "broadcast audio") |
| PL | Packet length indicator |
| CH | Audio channel number |
| LA | Language |
| MN | Message number |
| CT | Codec type |
| SE | Indicator for start/end/middle/whole packet |
| PN | Packet number |

Main Body:

| | |
|---|---|
| DATA | Audio data |

The protocol discriminator PD differentiates broadcast audio packets from other packet types. The packet length indicator PL indicates the length of the packet in total (i.e. not just the audio data part). The audio channel number CH differentiates between the various audio channels offered, and will be the main search item for the terminals filter. The language indicator LA allows for supplementary searching for messages in languages understood by the user. Message number MN allows messages to be sent more than once for improved error performance. Codec type CT specifies the speech codec and the bit rate used. The start/end indicator SE defines whether the audio segment carried is the start of an audio message, the end of one, a segment in between, or a whole message. Continuous audio streams will use the "middle" indication, whilst discontinuous audio streams (sound-bites) will use all four indications. Lastly for this example, packet number PN allows the ordering of several packets making up a long message. In the main body, the audio data comprises an arbitrary quantity of speech data encoded as per the codec type CT field.

Packets are sent at a rate consistent with the main body payload size and the required throughput. As a general rule, it is to be required that a portable terminal listens to all packets: in cases where broadcast capability is not fully utilised, duplication of packets can allow replacements of packets received in error or can allow the terminal to involve itself with another Bluetooth link and still receive all audio packets necessary.

If the enquiry mode is operated continuously then, for continuous audio streams, 10.24 seconds worth of audio per channel must be conveyed in each inquiry cycle. For a codec operating at 8 kbit/s, this corresponds to 10 kbytes of data. This may be carried in a single packet or broken down to smaller packets: as will be understood, there will be a trade-off between the extra overheads incurred by the repeated headers of smaller packets and the reduced reliability of a larger packet.

As not all of the inquiry period is devoted to broadcast information, the inquiry period is treated as a single large frame of length 10.24 seconds. For any audio channel, up to 10.24 seconds of data may need to be buffered at the transmitter before the frame begins in case it is transmitted early: likewise, enough data must be buffered in the receiver in case new data for the channel is received very late in the frame. A total latency of 20 seconds or so can be expected as a result. In the present example, using a codec of 8 kbit/s, an implementation could use 20 kbytes of buffer space at the receiver. With higher rate codecs, more space will be needed (e.g. 120 kbytes for a high bandwidth running at 48 kbit/s).

For discontinuous (sound-bite) services, such a delay will generally be irrelevant and the majority for continuous services, being one-way, can also tolerate this delay. Continuous services, for example those that commentate on live action, may have to be restricted to plays and operas and the like, whose action is readily predictable. The exact delay and the buffer sizes at master and slave depend on the format chosen for the broadcast inquiry service and how it is used.

Error correction and concealment strategies will also be affected.

When a user selects the service of interest, his request will either result in the setting of filters within the handset that will look for the appropriate channel number in the broadcast audio packet header or will result in negotiation with the server (over the air or via some other connection). In the first case, the handset will keep a look out for a broadcast audio data packet that has a header that matches any of several set filters (i.e. several discontinuous channels can be selected simultaneously) and will play out any such packets received. As a development of this feature, a special index that lists the audio information streams available is also cyclically broadcast to aid in the selection process. In the second case, the audio information streams broadcast are chosen by negotiation with the fixed network. Different cells of a CA site may be broadcasting different audio streams according to the dynamic wishes of the users served by each cell. A user moving to another cell will cause his streams to follow him. This scheme makes potentially better use of the valuable airtime, especially if there are large numbers of special interest audio streams available. With both approaches, the user actively selects channels that he particularly wants to listen to, this is to say those containing information that he wishes to "pull" from the broadcast channel. A minority of channels can be selected by default and allow for information to be "pushed" to the users. Typical uses of this will be advertising and emergency information services. The user will nevertheless be able to deselect all such "push" channels except for the emergency channel.

Considering further the applications of the low-rate audio broadcast provided in accordance with the present invention, it will be understood that continuous and discontinuous broadcast services may be provided. Continuous broadcast services will carry from one to around six channels of usually speech but possibly good quality stereo audio. The user will be listening primarily to one of these channels. Discontinuous broadcast channels allow for short sound-bites to be conveyed to a user who may be listening to something else. A sound-bite may therefore interrupt a locally generated audio signal or be mixed on top. Many such channels can be available because each is only active for a fraction of the total time. Of course, continuous and discontinuous channels can be mixed.

The following applications are intended as examples only. Many more will be apparent to persons skilled in the art. Although loudspeaker reproduction of the audio received is possible, it is assumed that, for the majority of applications, headphones will be used as the audio data presentation means to avoid disturbing other people nearby.

Dial-up Information Services

As well as the current time and weather, a user might be interested in selecting information on financial movements or sporting events. In many cases, the information needs to be updated in a near real-time manner as a stock moves up or down or a chosen team scores. By selecting the stream or streams of interest, a user can be kept up to date by short radio announcements (of a few seconds duration) relieving him of the inconvenience of having to retrieve his terminal in order to read the display. These sound-bites may be combined with locally generated audio from tape, disc or other source.

Public Address Systems

Large public establishments like airports or railway stations use public address systems to keep customers up-to-date on information such as arrival and departure times. Sound bites can be used here, too. By dialling for a particular flight or train of interest, a user can listen to music on headphones or wander into a quiet zone (such as an airline courtesy lounge or restaurant) without missing out on departure or arrival announcements. Supplementary information may be provided in the form of local directions to a terminal or platform, or announcement information in different languages.

Commentary Systems

It is not uncommon for a museum to accompany exhibits with a sound commentary. The cellular nature of Bluetooth allows exhibits to be appended with a specific commentary broadcast in a number of different languages, or in a single language time-staggered fashion so that the user does not have to wait too long for the start of the commentary. In a theatre (or, conceivably, in a cinema) supplementary audio channels might provide information for novice or blind audience members. Given the lengthy system delay, the commentary will be sent several tens of seconds ahead of the action it relates to, so this service is best suited to predictable (i.e. scripted) events.

Guides and Information Points

Guide services are also possible, with audio guides on tour buses being a known example. Whilst there are dedicated tourist buses in many cities, the invention provides a means whereby a multilingual tourist commentary may be provided on standard buses or trams that follow routes passing places of interest. A more mundane feature, but one that could be added to the previous or provided in its own right, is the delivery of station or stop announcements.

A city guide could make use of the beacon system to provide multilingual information and navigation aids. Road beacons may provide static or dynamic traffic information ("No left turn" or "Traffic Jam ahead"). The beacons could also support personal navigation, with a user registering a request for directions to a particular location, and these directions ("turn left at the end of the street") being delivered on what is effectively a users personal audio channel. In addition, sites of interest (parks, gardens, historic buildings and so on) can use audio beacons with a "push" channel for tourist information as a means to attract further visitors.

Advertising and Music Services

Whilst the above-mentioned services may utilise high quality audio coding, some services will require it. Advertisers will want to be able to play musical jingles associated with them and their products, whilst shopping malls may use the system to provide optional background music. Purveyors of music or videos could use the system to broadcast the latest music or soundtracks to draw the crowds, perhaps to an MP3 downloading station. Audio quality from mono a.m. radio quality (16 kbit/s) upwards would be required to allow these features, with a trade-off as expected between the quality and the number of channels.

From reading the present disclosure, other modifications will be apparent to persons skilled in the art. Such modifications may involve other features which are already known in the design, manufacture and use of fixed and portable communications systems, and systems and components for incorporation therein and which may be used instead of or in addition to features already described herein.

The invention claimed is:

1. A method for enabling the user of a portable communications device to received broadcast audio messages, the method comprising:
wherein at least one beacon device broadcasts a series of messages each in the form of a plurality of predetermined data fields arranged according to a first communications protocol;
wherein the beacon adds to each such message prior to transmission an additional data field carrying broadcast audio message data; and
wherein the portable communications device makes no transmission to the beacon to initiate transmission by the beacon prior to receiving the transmitted messages, extracts the audio broadcast data from said additional data field, and reproduces the audio to the user.

2. A method as claimed in claim 1, wherein said first communications protocol comprises Bluetooth messaging and the broadcast series of messages are inquiry messages for the establishment of two-way communications.

3. An audio data communications system comprising:
at least one beacon device capable of wireless message transmission; and
at least one portable device capable of receiving such a message transmission;
wherein the beacon is arranged to broadcast, without receiving a communication from the portable device, a series of messages each in the form of a plurality of predetermined data fields arranged according to a first communications protocol,
wherein the beacon is further arranged to add to each such message prior to transmission an additional data field carrying audio data, and
wherein the at least one portable device is arranged to receive the transmitted messages, read the audio data from said additional data field and reproduce the same for the user.

4. A system as claimed in claim 3, wherein the beacon is arranged to include an indication in one of said predetermined data fields, said indication denoting the presence of audio data in said additional data field.

5. A system as claimed in claim 3, wherein said first communications protocol comprises Bluetooth messaging.

6. A mobile communication device for use in the system of claim 3, the device comprising,
a receiver capable of receiving a short-range wireless message including a plurality of data fields according to said first communications protocol,
means for determining when said additional data field has been added to said plurality of data fields,
means for reading audio data from such an additional data field, and
reproduction means for presenting the same to a user.

7. A device as claimed in claim 6, wherein the receiver is configured to receive messages according to Bluetooth protocols.

8. The method of claim 1, further comprising broadcasting cyclically, by the at least one beacon, an index of available audio information streams.

9. The method of claim 1, wherein the at least one beacon broadcasts both continuous and discontinuous audio information streams.

10. The method of claim 1, wherein the portable device interrupts a continuous audio stream with data from a discontinuous audio stream.

* * * * *